E. ZYBACH & G. BRAUN.
POWER TRANSMISSION ATTACHMENT FOR AUTOMOBILES.
APPLICATION FILED MAR. 24, 1910.
982,756.
Patented Jan. 24, 1911.
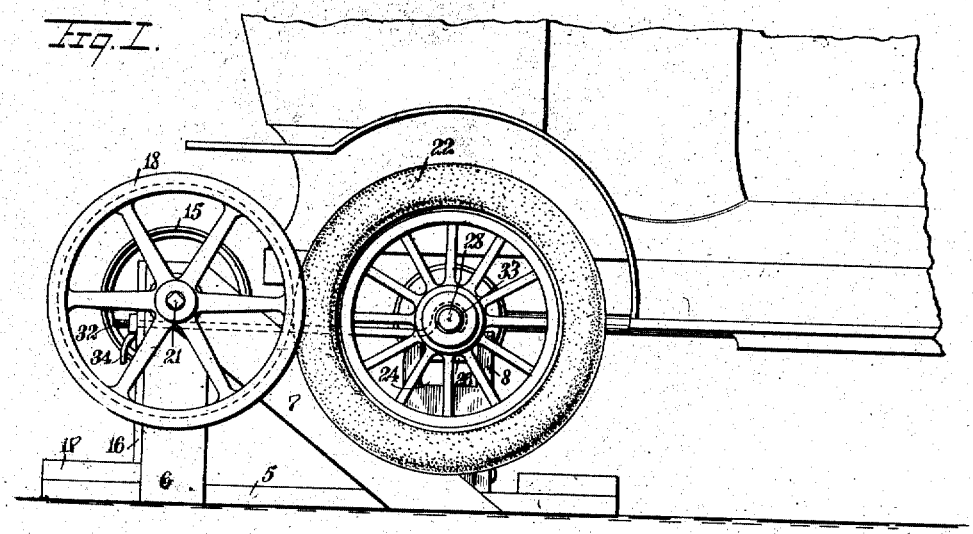
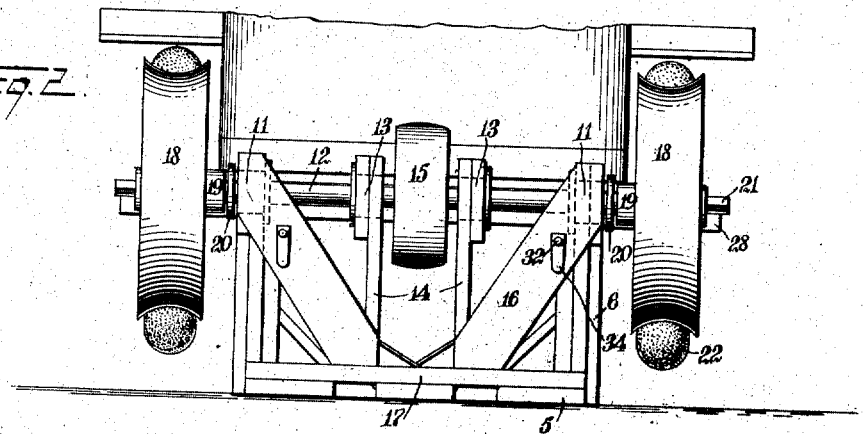
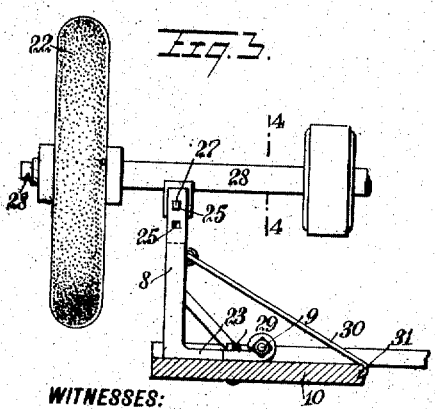
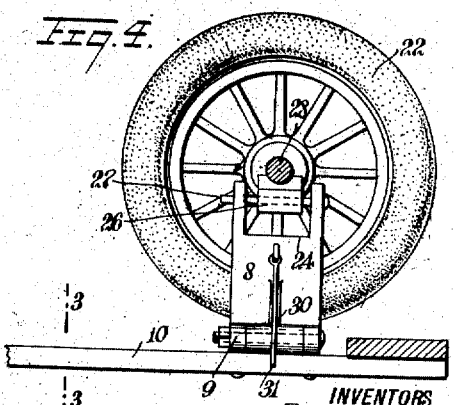
WITNESSES:
H. J. Walker
E. B. Marshall
INVENTORS
Edward Zybach
Gideon Braun
BY Munn & Co.
ATTORNEYS

UNITED STATES PATENT OFFICE.

EDWARD ZYBACH AND GIDEON BRAUN, OF DUNCAN, NEBRASKA.

POWER-TRANSMISSION ATTACHMENT FOR AUTOMOBILES.

982,756.  Specification of Letters Patent.  Patented Jan. 24, 1911.

Application filed March 24, 1910. Serial No. 551,350.

*To all whom it may concern:*

Be it known that we, EDWARD ZYBACH and GIDEON BRAUN, both citizens of the United States, and residents of Duncan, in the county of Platte and State of Nebraska, have invented a new and Improved Power-Transmission Attachment for Automobiles, of which the following is a full, clear, and exact description.

Our invention relates to power transmission attachments for automobiles, by which the engine of the automobile may be used to do a variety of work. As our attachment is constructed, it is adapted to support the rear axle of the automobile, with the wheels mounted on the said axle raised from the ground, and to hold in frictional contact with the said wheels of the automobile, driving wheels, the driving wheels being keyed to a shaft on which is mounted a pulley which may be connected by means of a belt with the machinery which is to be driven.

Still other objects of the invention will appear in the following complete description.

In this specification we will describe the preferred form of our invention, it being understood that the scope of the invention is defined in the appended claims.

Reference is to be had to the accompanying drawings forming a part of this specification, in which similar characters of reference indicate corresponding parts in all the views, and in which—

Figure 1 is a side elevation of our attachment shown as applied to an automobile; Fig. 2 is an end view of Fig. 1; Fig. 3 is a sectional view on the line 3—3 of Fig. 4; and Fig. 4 is a sectional view on the line 4—4 of Fig. 3.

By referring to the drawings it will be seen that a frame is provided consisting of bottom members 5, standards 6, which are secured thereto, braces 7, which connect the upper terminals of the standards with the bottom members 5, and angular supports 8 which have one set of their terminals hinged at 9 to members 10 of the frame. The standards 6 carry bearings 11 in which is journaled a shaft 12, there being also additional bearings 13 in which the shaft 12 is journaled, these additional bearings 13 being carried by additional standards 14 which are secured to the frame. A pulley 15 is keyed to the shaft 12 between the additional standards 14. Brace members 16 are secured to the standards 6 at their upper terminals, these brace members 16 being disposed inwardly and being secured to a transverse member 17 of the frame and to the additional standards 14.

Keyed to the shaft 12 are two driving wheels 18, the driving wheels 18 being disposed beyond the standards 6 and having inner hubs 19, these inner hubs being separated from the bearings 11 by means of washers 20. We prefer to use these washers 20 instead of collars on the shaft 12, for by means of this arrangement it is possible more readily to remove and replace the shaft 12 in its bearings. The outer terminals 21 of the shaft 12 which extend beyond the driving wheels 18, are angular in shape in order that either terminal may be connected to one end of a universal joint to the other end of which a shaft to be driven may be secured. The peripheries of the driving wheels 18 are concave transversely in order that a better frictional engagement may be had with the wheels 22 of the automobile, but if desired, the driving wheels 18 may be constructed without the concave surfaces.

The angular supports 8, which are hinged at 9 to the frame members 10, have one set of arms 23 which rest on the said frame members 10, the remainder of the supports extending upwardly and having recesses or cutaway portions 24. The supports 8 also have orifices 25 at each side of the cutaway portions 24, these orifices 25 extending to the said cutaway portions. Bearing members 26 having orifices, are provided, bolts 27 being disposed through the orifices in the bearing members 26, the bolts extending through said orifices 25, by which means the bearing members 26 are held in place on the supports 8. The bearing members 26 are considerably smaller than the cutaway portions 24 so that they may be moved upwardly and downwardly, and forwardly and rearwardly, so that they may be adjusted with reference to the automobile. These bearing members 26 are adapted to be disposed under the axle 28 of the automobile to support the said axle sufficiently high to raise the automobile wheels 22. The orifices 25 in the supports 8 are disposed above each other, so that the bearings 26 may be held in place relatively to the supports 8 as desired, and inasmuch as the bearing members 26 may be moved forwardly or rearwardly on the bolts 27, the automobile axle 28 may be carried by the bearings 26 near the forward or the rear ends of the supports, as may be desired. Bolts 29 are provided, by which the arms 23 of the supports 8 may be held firmly against the members 10 of the frame. Braces 30 are also provided, which are pivoted to the upwardly-extending members of the supports 8, these braces 30 having hooks 31 which engage the members 10 to assist in holding the supports in position. The braces 16 have orifices through which extend threaded terminals of tie members 32, the tie members 32 having hooks 33 at their outer terminals, the hooks being adapted to be disposed around the axle 28 of the automobile, nut members 34 being provided to engage the threaded terminals of the tie members 32 beyond the braces 16, by which means the frame may be held in place with the driving wheels 18 in frictional contact with the automobile wheels 22.

In using our invention, the supports 8 of the frame are disposed under the axle 28 of the automobile, and the automobile may be raised in any suitable manner, and the bearings 26 may be disposed in place under and in engagement with the axle 28. This having been done, the tie members 32 are adjusted in place, by which means the driving wheels 18 will be brought and held in contact with the automobile wheels 22. It will then be possible to start the engine and connect the pulley with the machinery which is to be driven, by means of a belt in the usual manner. It is, of course, understood that Babbitt metal is used in the bearing 26 and that Babbitt metal is also used in the bearings 11 and 13. As the supports 8 are hinged to the members 10, the device may be disposed in position, but with the supports 8 lowered before the rear axle of the automobile is raised, it being merely necessary to raise the supports 8 and adjust their bearing members 26 under the automobile axle after it has been raised with its wheels off the ground. When the automobile is to be freed from the attachment, the tie members 32 having been removed, the supports may be knocked inwardly to free the bearing members from the automobile axle without the necessity of raising the automobile axle free from the bearing members.

Having thus described our invention, we claim as new and desire to secure by Letters Patent:

1. In a power transmission attachment for automobiles, a frame having bottom members, standards secured to the bottom members, right angular supports, one set of terminals of the supports being hinged to the bottom members, bearings in the standards, a shaft journaled in the bearings, driving wheels mounted on the shaft, and additional bearings adapted to be disposed under an axle of an automobile, the additional bearings being mounted on the other set of terminals of the rightangular supports.

2. In a power transmission attachment for automobiles, a frame, bearings in the frame, a shaft journaled in the bearings, additional bearings in the frame adapted to support an axle of an automobile and permit it to move relatively to the frame, driving wheels on the shaft adapted to have frictional engagement with the wheels of the automobile mounted on the said axle, a tie member having a hook adapted to be disposed around the automobile axle, supported by the said additional bearings, and a threaded portion, the threaded portion of the tie member being disposed through an orifice in the frame, and a nut member which engages the threaded portion of the tie member and is adapted to press against the frame so that when the nut is turned home against the frame the tie member will draw the said automobile axle on the said additional bearings in the direction of the said driving wheels with the automobile wheels on the said axle pressing thereagainst.

3. In a power transmission attachment for automobiles, a frame having bottom members, standards, supports hinged to the bottom members, bearings in the standards, a shaft journaled in the bearings, driving wheels mounted on the shaft, the supports having cutaway portions, orifices leading to the said cutaway portions, additional bearings adapted to be disposed under an axle of an automobile, the additional bearings being disposed in the cutaway portions in the supports, there being orifices in the additional bearings, and bolts disposed in the orifices in the supports and in the additional bearings respectively, by which the additional bearings are carried by the supports.

4. In a power transmission attachment for automobiles, a frame having bottom members, standards, supports hinged to the bottom members, bearings in the standards, a shaft journaled in the bearings, driving wheels mounted on the shaft, the supports having cutaway portions, orifices leading to the said cutaway portions, additional bearings adapted to be disposed under an axle of an automobile, the additional bearings being disposed in the cutaway portions in the supports, there being orifices in the additional bearings, bolts disposed in the orifices in the supports and in the additional bearings respectively, by which the additional bearings are carried by the supports, and a tie member for holding the driving wheels against the wheels of the automobile having a hook adapted to be disposed around the automobile axle and a threaded portion, the threaded portion of the tie member being disposed through orifices in the frame, and a nut member which engages the threaded portion of the tie member.

5. In a power transmission attachment for automobiles, a frame having bottom members, standards, rightangular supports, one set of terminals of the supports being hinged to the bottom members, bearings in the standards, a shaft journaled in the bearings, driving wheels mounted on the shaft, the supports having cutaway portions, orifices leading to the said cutaway portions, additional bearings adapted to be disposed under an axle of an automobile, the additional bearings being disposed in the cutaway portions in the supports, there being orifices in the additional bearings, bolts disposed in the orifices in the supports and in the additional bearings respectively, by which the additional bearings are carried by the supports, means to hold the angular supports with the other set of terminals disposed at a distance above the bottom members, and means for holding the automobile axle relatively to the frame, the driving wheels being in frictional engagement with the automobile carried by the said axle.

6. In a power transmission device a frame, bearings in the frame, a shaft journaled in the bearings, horizontally disposed bolts supported on the frame, additional bearings mounted to slide on the bolts, and adapted to be disposed under the axle of an automobile, driving wheels on the shaft, adapted to have frictional engagement with the wheels of the automobile mounted on the said axle, and means for engaging the said axle and moving it and the said additional bearings to press the automobile wheels against the driving wheels.

In testimony whereof we have signed our names to this specification in the presence of two subscribing witnesses.

EDWARD ZYBACH.
GIDEON BRAUN.

Witnesses:
    JOHN KUMMER,
    ARNOLD LEMP.